United States Patent Office 3,464,923
Patented Sept. 2, 1969

3,464,923
LUBRICANT
Henri Roche, Neuilly-sur-Seine, and Alain Billot de Goldlin, Paris, France, assignors to Societe Anonyme Antar Petroles de l'Atlantique, Paris, France, a French corporation
No Drawing. Filed Mar. 13, 1967, Ser. No. 622,448
Claims priority, application France, Mar. 22, 1966, 54,564
Int. Cl. C10m 1/38, 1/24
U.S. Cl. 252—33.2                                    18 Claims

ABSTRACT OF THE DISCLOSURE

A process for producing a lubricating oil in which a stable, alkaline earth metal salt is incorporated.

---

The invention relates to the production of lubricants, particularly oils based on natural or synthetic hydrocarbons, in which products normally insoluble in said hydrocarbons are incorporated in a stable, homogeneous manner. Compounds which according to the invention may be incorporated in hydrocarbons are organic or inorganic salts or soaps, more particularly alkaline earth metal salts, such as calcium, barium, or magnesium nitrate, acetate, laurate, formate, and salicylate, and other similar salts.

It is known that in order to permit the stable, homogeneous incorporation of a solid compound in a liquid medium in which it is insoluble, it is necessary to make either a suspension of this compound in the liquid, particularly by mechanical means, or a pseudo-solution of said compound in the liquid.

The invention relates to the preparation of lubricants consisting of a pseudo-solution, which results from the conversion of a gel into a sol by an operation of the peptisation type and makes it possible to obtain products having substantially improved fineness and stability.

According to the invention, a process for the production of a lubricant based on hydrocarbons in which at least one alkaline earth metal salt is incorporated is characterised by the following successive steps:

preparation of a solution, preferably an aqueous solution, of the alkaline earth metal salt to the limit of saturation at ordinary temperature;
adjustment of the pH of the solution to a value higher than 10 at 20° C., adjustment to the final value being effected by raising pH;
formation of a viscous emulsion of the water-in-oil type by gradually introducing said solution into an emulsifier premixture containing hydrocarbon and emulsifying agent, said agent having a peptising power in relation to said salt solution, the latter being at a temperature between 0 and 25° C. when introduced into the emulsifier;
evaporation of the solvent immediately after homogenisation of the emulsion, in thin layers in contact with heated walls, until liberation of solvent vapour, particularly water vapour, has substantially ceased and production thereby of a gel;
abrupt cooling thereupon of the gel and addition of at least one diluent hydrocarbon, the temperature of the product during the dilution being maintained at a moderate value higher than ambient temperature, in order to effect the conversion of the gel into the desired pseudo-solution.

The process of the invention will be illustrated in detail hereinbelow in relation to its application to the preparation of a lubricating oil based on petroleum hydrocarbons in which calcium acetate is incorporated, for example in an amount between 1 and 2.5%, preferably of the order of 2% by weight referred to the hydrocarbons.

An aqueous solution of calcium acetate is first prepared in a manner known per se by neutralising an aqueous solution or suspension of a calcium salt, or for practical purposes of lime, by means of acetic acid, with agitation.

The invention calls, however, for features of preparation which are of great importance. The greater part of the lime is first suspended in water and acetic acid is introduced until the pH of the reaction solution is lower than 7, preferably of the order of 5, and most preferably equal to 5.6, the reaction temperature being maintained between 55 and 60° C. According to one feature of the present invention, for a pH of 5.6 the optimum reaction temperature is between 57 and 58° C. The reaction solution thus obtained being acid, lime is progressively added in small amounts until the final pH of the reaction solution is between 9 and 10 at the reaction temperature, and is advantageously between 9.2 and 9.6. When the pH is stabilised, agitation of the reaction solution is stopped and flocculation is then observed, followed by rapid settling out. The transparent supernatant liquid is then slowly filtered, and a clear solution is obtained the pH of which at 20° must, in accordance with the invention, be between 10 and 11. The optimum value of the pH at 20° of the calcium acetate solution obtained in this manner is substantially 10.5. For the preparation of the emulsion it is necessary for the quantity of calcium acetate solution which must be used in order to obtain the desired final calcium acetate content in the lubricating oil to be verified with great accuracy. This quantity may be determined in each case in dependence on the density and temperature of the solution.

In addition, a premixture is prepared of a hydrocarbon, which is preferably a predominantly naphthenic heavy hydrocarbon fraction, and an emulsifying agent having peptising power in relation to the calcium salt, preferably calcium sulphonate. It may be advantageous for the hydrocarbon which is used as base of the final lubricating oil to be utilised as hydrocarbon in the premixture. In this case, a quantity of hydrocarbon of the order of one sixth by weight of the final quanity of lubricant is suitable for the premixture.

For the preparation of the premixture, the calcium sulphonate or other suitable emulsifying agent is introduced slowly, with agitation, into the hydrocarbon. The temperature of the latter may be slightly in excess of ambient temperature. It is advantageously of the order of 20° C. and lower than 30° C., in order to obtain a homogeneous premixture. Nevertheless, in order to produce in the next stage of the process an emulsion having great fineness, it is indispensable that the premixture of emulsifying agent and hydrocarbon should be used at a temperature below 20° C.

In the next stage of the process of the invention the present emulsion is produced from the premixture previously and from the aqueous solution of calcium acetate prepared beforehand. It is moreover desirable that the emulsion should be prepared as soon as the premixture has been transferred to the emulsifying apparatus. The aqueous solution of calcium acetate is then introduced with a slow, regular flow into said apparatus. The emulsifying apparatus is maintained in operation for a few moments after all the aqueous solution has been introduced, and then the operation passes to the next stage, namely the evaporation of the solvent, that is to say of the water.

Immediately after completion of the preparation of the emulsion, evaporation of the solvent must be commenced in order to convert the initial viscous emulsion into a viscoelastic composition, namely the "gel."

In order to obtain this change of state, the evaporation of the solvent must be effected in continuously renewed thin layers on a hot wall at controlled temperature. For this purpose, the emulsion is transfererd to an evaporator, preventing air from entering the emulsion; in the evaporator, the emulsion is brought into contact with walls heated, for example, by steam. The wall temperatures at the beginning must not exceed 130° C. In practice it is preferable to effect the evaporation in a number of stages, which constitutes a preferred feature of the invention. In the course of the first stage the temperature of the emulsion mass rapidly rises to its boiling temperature, which is of the order of 101° C. In a second stage, which constitutes the actual evaporation, the temperature, of the walls remains substantially at 130° C. while the temperature of the mass is of the order of 101–102° C., and the greater part of the water contained in the mass is eliminated in the form of vapour. In the course of this stage the colour of the emulsion remains unchanged and white. The third stage of the evaporation constitutes the concentration. In the course of this stage, a further small quantity of water is eliminated while the paste contained in the evaporator gradually becomes brown. The temperature of the mass increases slightly to 102–103° C. The production of vapour declines substantially and the wall temperatures increase little by little from 130° C. to 136° C. or more, but care must be taken to see that they are always below 140° C. The end of the evaporation, which constitutes the last stage, is indicated by a rise in the temperature of the paste to 104–105° C., and beyond and by a rapid, marked change in the colour of the paste, which becomes a deep brown, while the liberation of water vapour ceases practically completely. It has been found in practice that the aforesaid sequence of temperatures, in conjunction with the maintenance of agitation and the recycling of the mass, make it possible to obtain optimum evaporation conditions. The exact value of the temperature of the emulsion mass obviously depends on the pressure in the evaporator, but the wall temperatures must always be kept within the limits fixed hereinbelow which characterise the invention.

For the purpose of simplification, the remarks made above relate to batchwise evaporation. It is also possible to operate continuously, which applies to the entire process, by regulating the temperatures of equilibrium of the mass of product in circulation and the temperature of the walls of the evaporator in dependence on pressure and flow.

In all cases it is necessary to watch very carefully the rise in temperature of the mass, which must not exceed 116° C. for the particular case considered by way of illustration. As soon as this temperature is reached, the mass constitutes a gel which according to the process of the invention is then transformed into a pseudo-solution.

For this purpose the temperature of the mass is abruptly lowered from 116° C. to 90° C. by instantaneously terminating the supply of heat to the walls of the evaporator, subjecting the latter to cooling, and introducing a diluent hydrocarbon at ambient temperature into the mass.

A conversion of this type may be likened to peptisation which in the course of the dilution supplies a final product in the form of a pseudo-solution. The dilution must be effected at a slow rate of flow, preferably under the following conditions: during the first third of the dilution the flow of hydrocarbon must not exceed 2% by weight of the quantity of gel after which the flow of hydrocarbon per unit of time may attain 2% of the final quantity of pseudo-solution to be obtained; according to an additional feature of the invention, the temperature of the mass, which is continuously agitated, must remain between about 50 and 80° C. A mixture of hydrocarbons may naturally be used for the dilution.

The final product is then charged into barrels, preferably at a temperature between 40 and 50° C. Introduction into barrels may thus be effected almost immediately after dilution.

Various qualities of lubricating oils may be obtained depending on the natureof the diluent oil used.

For the premixture use is preferably made of a heavy naphthenic oil essentially comprising a straight close distillation cut obtained from a naphthene crude. Cuts of this type are generally advantageously composed of a mixture of hydrocarbons of a mean molecular weight of 500.

The lightest hydrocarbons of an oil of this type contain 28 carbon atoms and have a molecular weight of about 400. The heaviest hydrocarbons contain 45 carbon atoms and have a molecular weight of about 625. They may contain at least 5 to 10% of aromatic hydrocarbons and 35 to 45% of naphthenic hydrocarbons.

The means characteristics of such cuts are:

Density 910–920 g./l.
Engler viscosity at 50° C: 15–20.
Viscosity index 40–50.
Open vessel flashpoint higher than 240° C.
Flow point lower than −18° C.

Finally, various lubricant additives, in solid or liquid form, which are usually employed in the grease and lubrication industry may be incorporated in the oil.

There is described below by way of illustration and without limiting the invention, one example of performance of the process of the invention for the production of a lubricating oil containing 2% by weight of calcium acetate in a petroleum hydrocarbon medium.

Example 1

592 kg. of 96% lime were introduced into a tank containing 4140 g. of water at about 15° C. and subjected to agitation. The pH of the reaction solution was then checked, and from 1080 to 1100 kg. of 90% acetic acid added immediately in a regular and rapid manner. It should be noted that the production of the calcium acetate solution, from the commencement of the introduction of the lime to the end of the neutralisation and the termination of agitation, must take place within a maximum time of about 1½ hours. The introduction of acetic acid into the aqueous lime solution was terminated when the pH of the reaction solution reached 5.6. The temperature rose rapidly during the reaction. At a temperature higher than 40° C. froth may be formed at the top of the reactor. This froth was eliminated by spraying cold water on to the reaction solution. At the end of the reaction the solution was at a temperature of 57–58° C. and had a pH of 5.6. Agitation was then maintained for about 10 minutes, whereupon the solution was neutralized by progressively adding further lime.

Up to pH 6, the lime was introduced in portions of about 2 kg. and two or three minutes were allowed to elapse between each introduction in order to permit measurement of a stablished pH. Up to pH 7.5, quantities of about 1 kg. were introduced, and starting from pH 7.5 additions were made in the form of a fraction of a kilogram until the final pH was obtained and stablised. The final pH was between 9.2 and 9.6. Practical experience has made it possible to determine that the value of the final pH was such that after filtration the decanted liquid had a pH of 10.5 at 20°. The total quantity of lime used was from 630 to 650 kg.

When the stabilisation of the final pH over a period of about ten minutes had been noted, a sample was taken from the reaction solution and agitation stopped. Flocculation was then observed, followed by rapid settling out.

At the top of the reactor a transparent liquid was thus obtained which consisted of an aqueous solution of calcium acetate. The liquid was then transferred with slow filtration into a storage tank.

The subsequent successive stages of the process of the invention were then carried out without interruption, namely formation of the emulsion, evaporation of the emulsion, and dilution.

The exact quantity of calcium acetate solution necessary for the production of the emulsion was first introduced into a container, the percentage of calcium in the final product having to be equal to 2%. For this purpose the density and temperature of the solution were measured; a concentration of the solution equal to 22.6% at 20° was thus determined, with a density of 1.130, which corresponded to a quantity of about 923 litres of calcium acetate solution intended for the production of the emulsion. The appropriate values may naturally be determined in each case.

A premixture was then prepared by using 435 kg. of heavy naphthenic oil, referred to hereinbelow as "Diesel 18 base" oil.

This oil is obtained by direct distillation cut from a Venezuelan crude (Lagunillas), solvent treated, and having the following characteristics:

Density 913±2, g./l.
Engler viscosity at 50° C.=17.5±5.
Viscosity index=5.
Open vessel flashpoint about 245° C.
Flow point: —21.
Conradson 0.10.

For the premixture, 75 kg. of calcium sulphonate, available on the market under the name "Oronite 246 F" were also used as emulsifier. These quantities were fixed for the production of a quantity of final lubricating oil substantially equal to 3 tons.

The total quantity of "Diesel 18 base" oil (435 kg.) was introduced into a premixing tank, if required heated to 20° but at most at a temperature of 30° C. about one hour before the calcium sulphonate in order to eliminate any trace of air entrainment. The calcium sulphonate, heated to a maximum of 30–40° C. was then introduced slowly and continuously, without exceeding 2 gk. per minute, with agitation. On completion of the introduction of the calcium sulphonate, agitation was maintained for about 15 minutes longer. The premixture was then allowed to stand, the storage tank being cooled until the temperature of the premixture was lower than 20° C. Agitation was then resumed and the premixture was transferred to the emulsifier apparatus for the production of the parent emulsion. Once the premixture (510 kg.) had been completely transferred, the emulsifier apparatus was put into operation, this being an apparatus known under the name "Rotamix," and introduction of the calcium acetate solution (923 litres) was started only five minutes after the "Rotamix" had been started up. The calcium acetate solution was added slowly and very regularly at the rate of 10 litres per minute, the total time taken for the introduction being therefore substantially equal to 1½ hours. The "Rotamix" was kept operating continuously throughout the period during which the calcium acetate solution was introduced and for 15 minutes more. Immediately afterwards the emulsion was transferred to the evaporator by means of a pump.

The evaporator was constituted by a conventional double walled reactor heated by a steam jacket and provided with agitation and recycling means. Steam was introduced at the beginning at a pressure ranging from 2.5 to 3 kg. Evaporation was effected in a plurality of stages.

During the first hour of the evaporation the temperature of the mass rapidly rose to the boiling temperature of 101° C. which was reached after about 40–50 minutes. The steam pressures in the jacket were adjusted so that the wall temperatures did not in any case exceed 130° C. During this period the colour of the emulsion remained perfectly white.

The second stage, which corresponds to the actual evaporation, lasted from three to five hours, about 700 litres of water being eliminated; the colour of the paste remained white and its temperature was about 101–102° C. For this purpose the temperature of the evaporator walls were kept at about 130° C.

In the third stage concentration was effected for from 1 to 2 hours, in the course of which 100 litres of water were further eliminated in the form of vapour, while the addition of dilution oil. It is important that the temture being maintained at about 102° C. or 103° C. The steam pressure in the vaporator jacket was allowed to stabilize and the temperature of the walls gradually increased by a few degrees, reaching 133° C. The emulsion continued to change to brown in colour and the liberation of steam declined substantially. The temperature of the walls continued to rise to about 136° C., but care was taken to ensure that this temperature was always below 140° C.

In the course of the last stage, the end of the evaporation was noted from the progressive rise in temperature of the mass, the almost complete cessation of the liberation of steam, and the very marked and rapid change in the colour of the paste. The temperatures of the evaporator walls, which must remain below 140° C., and the temperature of the mass, which in less than half an hour passed from 104 to 116° C., were watched very carefully.

When the temperature of the mass reached the precise value of 116° C., evaporation was immediately terminated by rapidly and simultaneously effecting the instantaneous stoppage of the introduction of steam and the addition of dilution oil. It is important that the temperature of the mass should drop rapidly; in less than 10 minutes this temperature fell to 90°.

For the final charge of 3 tons of lubricating oil containing 2% of calcium, 2281 kg. of dilution oil were introduced with agitation into the paste resulting from the evaporation of the emulsion.

The exact volume in litres of the dilution oil was obviously calculated in dependence on the temperature at which the latter was stored. The rate of flow for the introduction of the dilution oil was low at first and was kept at a value below 25 litres per minute. When the temperature of the mass reached 90° C., dilution oil was added more quickly at a rate of flow of 50 litres per minute. The agitation and recycling were continued throughout the dilution time and for about 15 minutes after the end of the introduction of the oil.

Finally, 3 tons of lubricating oil having the following characteristics were obtained:

| | |
|---|---|
| Density at 20° C. | 0.930–0.945 g./cc. |
| Engler viscosity at 20° C. | 125–180. |
| Engler viscosity at 50° C. | 15–20. |
| Sulphated ash | 6.5–7. |
| Calcium content | 2%. |
| Flashpoint | Higher than 215° C. |
| Water | About 0.3%. |
| Alkalinity index | Alkaline (0.01; 0.2). |
| Centrifuging test 3 hours at 1400 r.p.m.—percent solid matter | Between 0.15 and 0.20. |

In fact, as has previously been indicated, the dilution of the "gel" obtained at the end of the concentration period makes it possible to obtain different products depending on the type and quality of oil used for the conversion into finished products by dilution.

However, the gel may be used directly as such without any dilution, either as an anti-rust protective product or for the lubrication of slow, very hot bearings, pivots, and so on.

A product of this type may for example have the following characteristics:

| | | |
|---|---|---|
| Density at 20° C. | g./cc. | 1.02 |
| Engler viscosity at 100° C. | About | 60 |
| Total base number | About | 220 |

Examples of the production of a certain number of lubricating products coming within the scope of the invention will be given below.

Example 2

The introduction into the gel prepared in Example 1 of 33% by weight of a paraffinic and naphthenic base cut having a viscosity equal to about 10 at 50° C. makes it possible to obtain a lubricant which may be used as an anti-rust medium or for the lubrication of bearings, pivots, and so on. This lubricant has the following characteristics:

Density at 20° C.—0.995 g./cc.
Engler viscosity at 50° C. about 115
Engler viscosity at 100° C. about 12
Total base number about 165

Example 3

The introduction into the gel prepared in Example 1 of about four times its weight of a nephthenic diesel oil having an Engler viscosity of 9 to 10 at 50° C. makes it possible to obtain a product for the separate lubrication of diesel engine cylinders which are semi-slow or slow at medium powers.

This lubricating product has the following main properties:

Density at 20° C.: 0.930
Engler viscosity at 50° C.: 14
Total base number about 45

Example 4

The introduction into the gel prepared in Example 1 of two or three times it weight of a mixture of base oils, optionally doped by means of an anti-oxidising agent makes it possible to obtain special lubricants for slow diesel engine cylinders which have a variable alkalinity reserve (total base number from 50 to 70) and which are particularly used in engines utilising heavy fuels having a high sulphur content.

The total base number of the final product is modified at will in dependence on the characteristics of the engine and the sulphur content of the fuel.

Example 5

The introduction into the gel prepared in Example 1 of three times it weight of a solvent treated naphthenic diesel oil having an Engler viscosity at 50° C. of 14 to 18 makes it possible to obtain an oil which is particularly suitable for the lubrication of compressors for gases for synthesis.

Example 6

A lubricant possessing particularly advantageous properties was obtained by incorporating in the gel prepared in Example 1 about twice its weight of a high thermal quality diesel oil containing anto-oxidising additives and a determined percentage of colloidal graphite and molybdenum disulphide. The ingredients of this lubricant will be defined more precisely hereinbelow.

The mineral fraction of the dilution oil is constituted by a mixture of heavy and medium solvent treated naphthenic base oils and a semi-light 250–300 neutral paraffinic fraction.

This base oil mixture contains anti-oxidising additives and also 0.075% of colloidal graphite (particles size about one micron) and 0.007% of molybdenum disulphide (particle size about one half micron).

In a general way the use of lubricants containing calcium acetate according to the invention has been found very beneficial in respect of reduction of wear by corrosion due to fuel having a high sulphur content.

The incorporation of graphite and molybdenum disulphide in hydrocarbons makes it possible to obtain reductions of mechanical wear.

It has been found that the association of these known solid additives with calcium acetate in a lubricating oil according to the invention constitutes a stable and homogeneous combination of calcium acetate, graphite, and molybdenum disulphide, which are normally insoluble in hydrocarbons. In the field of lubrication of large bore, highly supercharged diesel engine cylinders results are thus obtained, both in respect of lubrication and wear and in respect of cleanliness and maintenance, which exceed those obtained separately either by an oil containing calcium acetate alone or by an oil containing known solid lubricants based on graphite and molybdenum disulphide.

What is claimed is:

1. A process for the production of a hydrocarbon lubricant incorporating at least one alkaline earth metal salt comprising the steps of:
   (a) preparing a solution of alkaline earth metal salt to the limit of saturation at ordinary temperature;
   (b) adjusting the pH of the transparent solution obtained on settling to a value higher than 10 at 20° C., adjustment to said value being effected by raising pH;
   (c) forming a viscous emulsion of the water-in-oil type by gradually introducing said solution into an emulsifier premixture containing hydrocarbon and emulsifying agent, said agent having a peptising power in relation to said salt solution, the latter being at a temperature between 0 and 25° C. when introduced into the emulsifier;
   (d) homogenising said emulsion and immediately thereafter evaporating the solvent of the solution in thin layers in contact with heated walls, until liberation of solvent vapour has substantially ceased, thereby producing a gel;
   (e) thereupon abruptly cooling the gel and adding at least one diluent hydrocarbon, the temperature of the product during the dilution being maintained at a moderate value higher than ambient temperature, in order to effect the conversion of the gel into a pseudosolution.

2. A process according to claim 1 wherein said solvent is water.

3. A process according to claim 2 wherein the alkaline earth metal salt is calcium acetate.

4. A process according to claim 3, wherein the aqueous solution of calcium acetate is prepared by neutralising lime by means of acetic acid to a pH lower than 7, at a temperature ranging from 55 to 60° C., after which lime is progressively added in order to obtain a pH between 9 and 10.

5. A process according to claim 3 wherein the aqueous solution of calcium acetate is prepared by neutralising lime by means of acetic acid to a pH of 5.6 at a temperature ranging from 55 to 60° C., after which lime is progressively added in order to obtain a pH between 9.2 and 9.6.

6. A process according to claim 3, where the pH of the transparent aqueous solution of calcium acetate obtained after settling is between 10 and 11.

7. A process according to claim 1, characterised in that the premixture contains a predominantly naphthenic heavy hydrocarbon fraction and an emulsifying agent having peptising power in relation to the alkaline earth metal salt.

8. A process according to claim 7 wherein the emulsifying agent is calcium sulphonate.

9. A process according to claim 1, wherein the premixture is used at a temperature below 20° C.

10. A process according to claim 1, wherein the solvent is evaporated from the emulsion in an evaporator the wall temperatures of which do not exceed 130° C. at the beginning and are always below 140° C.

11. A method according to claim 10 wherein during the first stage of the evaporation the temperature of the emulsion mass rises rapidly to boiling temperature, which is of the order of 101° C.

12. A process according to claim 10 wherein the course of the second stage of the evaporation the greater part of the solvent is eliminated, the colour of the latter remaining unchanged.

13. A process according to claim 10, wherein the course of the third stage of the evaporation the temperature of the mass increases slightly, and the mass becomes brown in colour, while the temperatures of the walls of the evaporator likewise increase but remain below 140° C.

14. A process according to claim 10, wherein the evaporation is terminated when a rapid and pronounced change of colour of the paste, which becomes a deep brown, is noted and the liberation of solvent vapour practically ceases.

15. A process according to claim 10, wherein as soon as the mass attains the temperature of 116° C. it is abruptly cooled from 116° C. to 90° C. by instantaneously cooling the walls of the evaporator and introducing into the mass a diluent hydrocarbon which is at ambient temperature.

16. A process according to claim 1, wherein during the first third of the dilution the flow of hydrocarbon does not exceed 2% by weight of the quantity of gel, after which the flow of hydrocarbon per unit of time may attain 2% of the final quantity of pseudo-solution to be obtained.

17. A process according to claim 16, characterised in that the temperature of the mass during the dilution is between about 50 and about 80° C.

18. A process for the production of a hydrocarbon lubricant comprising the steps of:
(a) preparing an aqueous saturated solution of calcium acetate by neutralising lime by means of acetic acid to a pH of 5.6 at a temperature ranging from 55 to 60° C., and then progressively adding lime to obtain a pH between 9.2 and 9.6;
(b) raising the pH of the transparent aqueous solution obtained on settling to a value between 10 and 11 at 20° C.,
(c) forming a viscous water-in-oil emulsion by gradually introducing the transparent aqueous solution into an emulsifier premixture containing a predominantly naphthenic heavy hydrocarbon fraction and calcium sulphonate at a temperature below 20° C.;
(d) homogenising said emulsion and immediately thereafter evaporating the water from the solution in thin layers in contact with walls heated at first to not more than 130° C., the temperature of the emulsion mass initially rising to boiling at about 101° C., later becoming brown whereupon the wall temperature may reach 140° C., until the mass reaches 116° C., thereby producing a gel;
(e) thereupon abruptly cooling the gel to 90° C., and diluting the mass with a hydrocarbon in an amount of not more than 2% by weight of gel, the temperature of the product during dilution being maintained between about 50° C. and about 80° C.

References Cited
UNITED STATES PATENTS

| | | | |
|---|---|---|---|
| 3,223,627 | 12/1965 | Vesterdal | 252—39 X |
| 3,231,495 | 1/1966 | Morway et al. | 252—39 X |
| 3,234,130 | 2/1966 | Nixon et al. | 252—39 |
| 3,262,880 | 7/1966 | Voorhees | 252—25 |

DANIEL E. WYMAN, Primary Examiner

W. J. SHINE, Assistant Examiner

U.S. Cl. X.R.

252—18, 25, 39